(12) United States Patent
Yin et al.

(10) Patent No.: US 11,853,754 B2
(45) Date of Patent: Dec. 26, 2023

(54) MASK OPERATION METHOD FOR EXPLICIT INDEPENDENT MASK REGISTER IN GPU

(71) Applicant: HUAXIA GENERAL PROCESSOR TECHNOLOGIES INC., Beijing (CN)

(72) Inventors: Chengxin Yin, Beijing (CN); Lei Wang, Beijing (CN)

( * ) Notice: Subject to any disclaimer, the term of this patent is extended or adjusted under 35 U.S.C. 154(b) by 177 days.

(21) Appl. No.: 17/618,506

(22) PCT Filed: Jun. 11, 2020

(86) PCT No.: PCT/CN2020/095649
§ 371 (c)(1),
(2) Date: Jan. 11, 2022

(87) PCT Pub. No.: WO2020/249052
PCT Pub. Date: Dec. 17, 2020

(65) Prior Publication Data
US 2022/0236988 A1    Jul. 28, 2022

(30) Foreign Application Priority Data

Jun. 13, 2019   (CN) .......................... 201910512317.6

(51) Int. Cl.
G06F 9/30    (2018.01)
G06F 9/38    (2018.01)

(52) U.S. Cl.
CPC ...... *G06F 9/30018* (2013.01); *G06F 9/30036* (2013.01); *G06F 9/30105* (2013.01); *G06F 9/3887* (2013.01)

(58) Field of Classification Search
None
See application file for complete search history.

(56) References Cited

U.S. PATENT DOCUMENTS

| 5,210,839 | A | * | 5/1993 | Powell | G06F 9/30036 |
|---|---|---|---|---|---|
| | | | | | 711/212 |
| 7,523,370 | B1 | * | 4/2009 | Keller | G01R 31/318547 |
| | | | | | 714/729 |
| 9,384,713 | B1 | | 7/2016 | Wyatt et al. | |
| 9,921,832 | B2 | * | 3/2018 | Hartono | G06F 9/3001 |
| 2015/0378733 | A1 | * | 12/2015 | Beylin | G06F 9/5094 |
| | | | | | 712/226 |

(Continued)

FOREIGN PATENT DOCUMENTS

| CN | 103970506 | A | * | 8/2014 | ......... G06F 9/3001 |
|---|---|---|---|---|---|
| CN | 103970506 | A | | 8/2014 | |
| CN | 107193537 | A | | 9/2017 | |

*Primary Examiner* — Eric Coleman
(74) *Attorney, Agent, or Firm* — Andrew C. Cheng

(57) ABSTRACT

Provided is a mask operation method for an explicit independent mask register in a GPU. The method comprises: each GPU hardware thread being able to access respective eight 128-bit-wide independent mask registers, which are recorded as $m0-$m7. With regard to mask operation instructions of the explicit independent mask register in the GPU, each hardware thread in the GPU is able to access respective eight 128-bit-wide independent mask registers, and four groups of mask operation instructions are available for a user, and respectively realize a reduction operation, an extension operation and a logic operation on the mask register, and data movement between the mask register and a general vector register.

5 Claims, 4 Drawing Sheets

(56) References Cited

U.S. PATENT DOCUMENTS

2016/0179520 A1* 6/2016 Jha ..................... G06F 9/30032
                                                              712/5
2019/0278605 A1* 9/2019 Emberling .......... G06F 9/30101

* cited by examiner

MASK OPERATION METHOD FOR EXPLICIT INDEPENDENT MASK REGISTER IN GPU

The present disclosure claims a priority of Chinese Application No. 201910512317.6, filed in the Chinese Patent Office on Jun. 13, 2019, and entitled "Mask Operation Method for Explicit Independent Mask Register in GPU", the entire contents of which are herein incorporated by reference.

TECHNICAL FIELD

The present disclosure relates to the technical field of image processing units, and in particular to a mask operation method for an explicit independent mask register in a GPU.

BACKGROUND

A modern graphics processor includes many programmable processor kernels for executing shader codes, and graphics-specific hardware acceleration units. Initially, these processor kernels are used for executing the shader codes in graphics applications, and later it is discovered that the processor kernels can well process non-graphics computing-intensive applications, so that the modern graphics processor has developed into a general graphics processor.

In a graphics application, a GPU needs to process a huge number of vertices and fragments, it is impossible to write a code for each of these objects separately, therefore, a shader for processing the vertices and a shader for processing the fragments are defined in a GPU programming model, a user can describe an algorithm for processing the vertices and the fragments in the Shader, a similar method is used for a GPGPU application, a huge number of processing objects are defined in the programming model, these objects are called work items, and the user will specify a kernel to describe how to process these work items.

The graphics processor combines multiple vertices or the work items in the kernel into threads, and executes a corresponding shader program and a kernel program in a single-instruction-multiple-data manner, when there is a condition control code in the program, one method for solving this problem by using an SIMD implementation mode is to use an execution mask to control the output of an execution result, only when the value of a corresponding bit in a mask is 0x1, a corresponding destination operand will be rewritten, in order to save an encoding space of a GPU instruction word, it is generally implemented in the graphics processor by a single implicit mask register, as shown in FIG. 1, and when there are many condition control statements in the shader or kernel code or nesting occurs, the mask register of the current instruction cannot be changed by using the single implicit mask register ($exec), resulting in frequent movement of data between the implicit mask register and a general register. As a result, not only the number of instructions in the program is increased, the delay in the execution of the program is also prolonged, and at the same time, the power consumption of the programmable processor kernel will be increased by additional reading and writing between the registers.

SUMMARY

The purpose of the present disclosure is to provide a mask operation method for an explicit independent mask register in a GPU, so as to solve the following problem mentioned in the background art: the graphics processor combines multiple vertices or the work items in the kernel into threads, and executes a corresponding shader program and a kernel program in a single-instruction-multiple-data manner, when there is a condition control code in the program, one method for solving this problem by using an SIMD implementation mode is to use an execution mask to control the output of an execution result, only when the value of a corresponding bit in a mask is 0x1, a corresponding destination operand will be rewritten, in order to save an encoding space of a GPU instruction word, it is generally implemented in the graphics processor by a single implicit mask register, and when there are many condition control statements in the shader or kernel code or nesting occurs, the mask register of the current instruction cannot be changed by using the single implicit mask register ($exec), resulting in frequent movement of data between the implicit mask register and a general register. As a result, not only the number of instructions in the program is increased, the delay in the execution of the program is also prolonged, and at the same time, the power consumption of the programmable processor kernel will be increased by additional reading and writing between the registers.

In order to achieve the above purpose, the present disclosure provides the following technical solution: a mask operation method for an explicit independent mask register in a GPU, including the following steps:

S1: each GPU hardware thread being able to access respective eight 128-bit-wide independent mask registers, which are recorded as $m0-$m7;

S2: defaulting data in the $m0 as an execution mask of a GPU hardware thread instruction, and specifying the execution mask of the current instruction by changing a mask address field MSA of the instruction in a program code;

S3: respectively using instructions to implement a reduction operation, an expansion operations and a logical operation on each mask register, and data movement between each mask register and a general vector register, specifying a corresponding mask register while retaining the nearest parent mask register, and processing a child-parent mask relationship by using a binary tree manner;

S4: when the use of the mask register exceeds 8, storing temporarily unused mask operands in the general vector register by means of a movement instruction, and acquiring the mask operands again from the general vector register if necessary;

S5: implementing a mask reduction operation by using a vector execution unit, completing general and explicit reading of mask reduction, so as to avoid bringing an instruction transmission overhead, and determining whether to add the reduction operation after a user analyzes an application program; and S6: when the explicit mask register processes condition control, storing later condition codes in the mask register, and then generating the mask of an instruction sequence of a true branch and the condition code of the instruction sequence of a false branch, wherein the explicit mask avoids the problem of a single mask being covered and restored after being covered, and reduces the data movement between the general vector register and the mask register.

In an embodiment, the 128-bit masks and the vector execution unit are organized in a parallel manner of SIMD16, and one mask register can cover 8 executions of the vector unit.

In an embodiment, when a vector instruction of the vector unit is transmitted, it is judged whether the mask registers of the instruction are all zero, if so, it means that the instruction will not have any valid output, and the reading and execution of the operation of the corresponding instruction can both be avoided.

In an embodiment, the width of the SIMD 16 needs to be reduced, and when a reduction result is not zero, the operand needs to be read and the instruction needs to be transmitted, that is, the mask processing of the SIMD 16 is completed.

In an embodiment, the mask reduction instruction can further avoid an inefficient reduction operation before the instruction is transmitted after the analysis of the user, that is, the reduction can certainly exert the aforementioned performance and power consumption optimization effects.

Compared with the prior art, the present disclosure has the following beneficial effects: the explicit independent mask register and the mask operation instruction in the GPU propose a type of instructions of the explicit independent mask register and the mask operation instruction that are implemented in the graphics processor, each GPU hardware thread in the GPU is able to access respective eight 128-bit-wide independent mask registers, which are recorded as $m0-$m7, wherein the data in the $m0 is defaulted as the execution mask of the GPU hardware thread instruction, and the execution mask of the current instruction can also be specified by changing the mask address field MSA of the instruction, four groups of mask operation instructions are available for the user, and respectively realize the reduction operation, the extension operation and the logic operation on the mask register, and the data movement between the mask register and the general vector register, by means of the instruction, the generation of a branch mask during condition control can be realized, and meanwhile a mask value can also be calculated, such that an instruction emission process in a programmable kernel is optimized, and the reading of an ineffective operand and the execution of a pipeline operation are avoided, thereby reducing programmable power consumption.

DETAILED DESCRIPTION OF THE EMBODIMENTS

A clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those of ordinary skill in the art based on the embodiments of the present disclosure without any creative effort, fall into the protection scope of the present disclosure.

Figure 1:
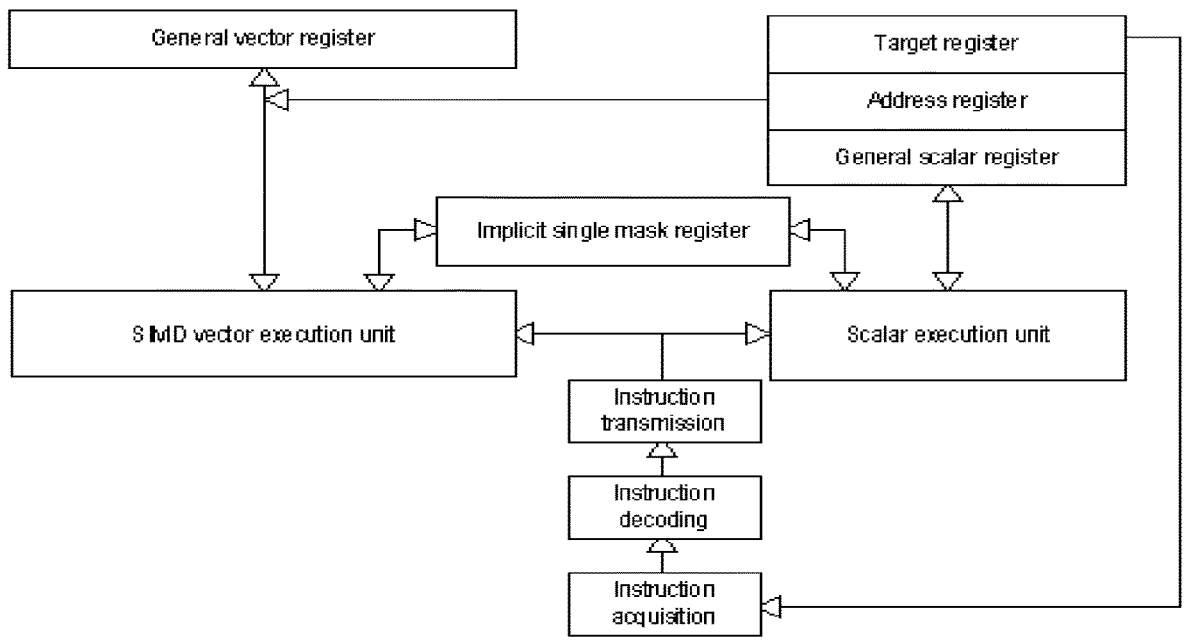
FIG. 1 is a schematic diagram of an implicit unit mask register of an embodiment of the present disclosure.
Figure 2:
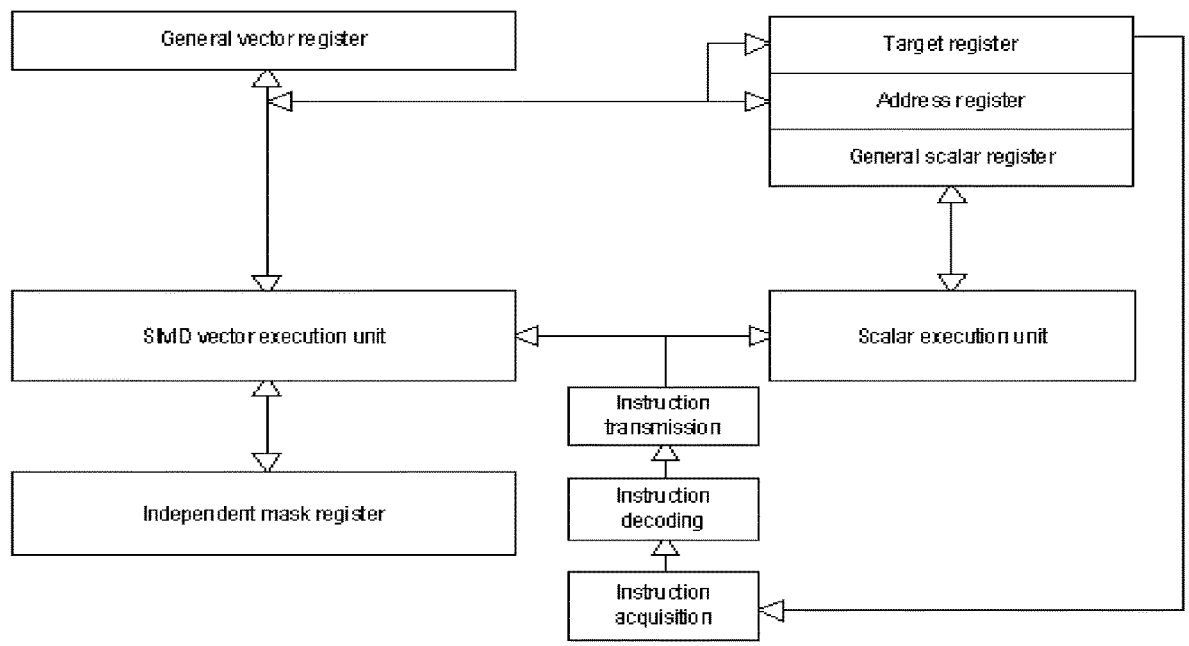
FIG. 2 is a schematic diagram of a programmable processor kernel of a first reduction of an embodiment of the present disclosure.
Figure 3:
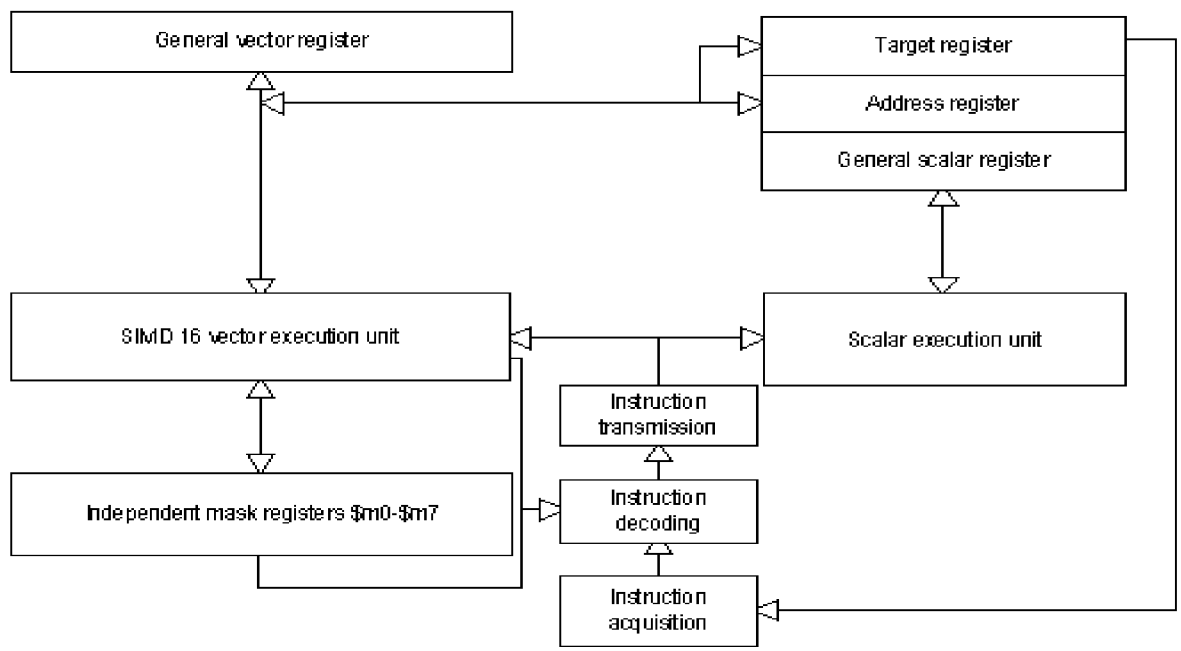
FIG. 3 is a schematic diagram of a programmable processor kernel of a second reduction of an embodiment of the present disclosure.
Figure 4:
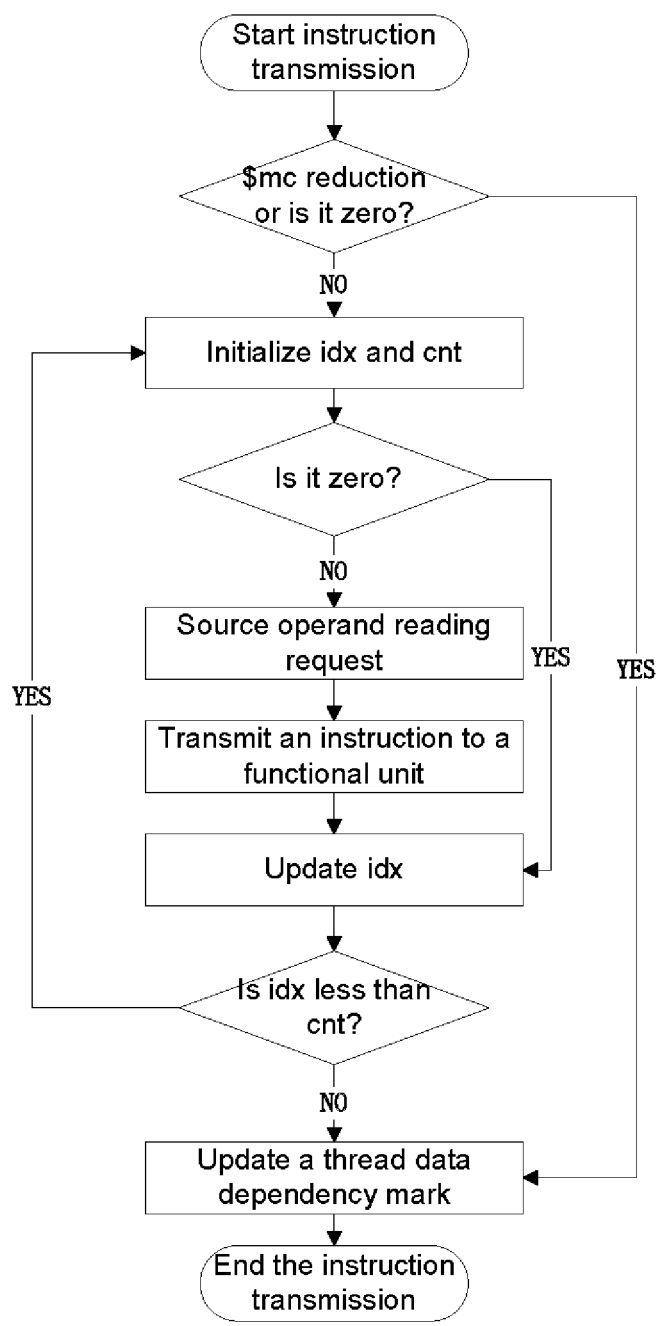
FIG. 4 is a schematic diagram of a transmission process of an embodiment of the present disclosure.

The present disclosure provides a technical solution: as shown in FIG. 2 and FIG. 4, a mask operation method for an explicit independent mask register in a GPU, including the following steps:

S1: each GPU hardware thread being able to access respective eight 128-bit-wide independent mask registers, which are recorded as $m0-$m7;

S2: defaulting data in the $m0 as an execution mask of a GPU hardware thread instruction, and specifying the execution mask of the current instruction by changing a mask address field MSA of the instruction in a program code;

S3: respectively using instructions to implement a reduction operation, an expansion operations and a logical operation on each mask register, and data movement between each mask register and a general vector register, specifying a corresponding mask register while retaining the nearest parent mask register, and processing a child-parent mask relationship by using a binary tree manner;

S4: when the use of the mask register exceeds 8, storing temporarily unused mask operands in the general vector register by means of a movement instruction, and acquiring the mask operands again from the general vector register if necessary;

S5: implementing a mask reduction operation by using a vector execution unit, completing general and explicit reading of mask reduction, so as to avoid bringing an instruction transmission overhead, and determining whether to add the reduction operation after a user analyzes an application program; and S6: when the explicit mask register processes condition control, storing later condition codes in the mask register, and then generating the mask of an instruction sequence of a true branch and the condition code of the instruction sequence of a false branch, wherein the explicit mask avoids the problem of a single mask being covered and restored after being covered, and reduces the data movement between the general vector register and the mask register.

The 128-bit masks and the vector execution unit are organized in a parallel manner of SIMD16, and one mask register can cover 8 executions of the vector unit, when a vector instruction of the vector unit is transmitted, it is judged whether the mask registers of the instruction are all zero, if so, it means that the instruction will not have any valid output, the reading and execution of the operation of the corresponding instruction can both be avoided, the width of the SIMD 16 needs to be reduced, when a reduction result is not zero, the operand needs to be read and the instruction needs to be transmitted, that is, the mask processing of the SIMD 16 is completed, and the mask reduction instruction can further avoid an inefficient reduction operation before the instruction is transmitted after the analysis of the user, that is, the reduction can certainly exert the aforementioned performance and power consumption optimization effects.

In specific use, as shown in FIG. 4, firstly, when the explicit mask register processes condition control, the later condition codes are stored in the mask register, and then the mask of the instruction sequence of the true branch and the condition code of the instruction sequence of the false branch are generated according to AND, clearing and logic operations. Compared with the implicit single mask register, the programmable processor kernel of the present disclosure is further provided with an independent mask register and a mask reduction guided instruction transmission unit. With regard to the 128-bit mask $mc, the vector execution unit is organized in the parallel manner of SIMD16, one mask register can cover 8 executions of the vector unit, which reduces the instruction acquisition pressure. When the vector instruction is transmitted, it is preferentially judged whether the mask registers of the instruction are all zero, if so, it means that the instruction will not have any valid output, in this way, the reading and execution of the source operation of the corresponding instruction can both be avoided. In order to avoid the occurrence of data dependence, a dependence mark should also be cleared. When a part of the masks is all zero, the result of the reduction operation cannot be reflected, so it is necessary to reduce the masks according to the width of 16 bits. When the current 16-bit reduction result is not zero, the operand needs to be read and the instruction needs to be transmitted, otherwise, they will be processed in accordance with a normal instruction transmission procedure, until all the SIMD16 masks covered by the masks are completely processed, and the instruction transmission is terminated.

Although the present disclosure has been described above with reference to the embodiments, without departing from the scope of the present disclosure, various improvements can be made to it and components therein can be replaced with equivalents. In particular, as long as there is no structural conflict, various features in the embodiments disclosed in the present disclosure can be combined with each other in any manner, and the description of these combinations is not exhaustive in this specification for omitting the space and saving resources. Therefore, the present disclosure is not limited to the specific embodiments disclosed herein, but includes all technical solutions falling within the scope of the claims.

What is claimed is:

1. A mask operation method for an explicit independent mask register in a GPU, comprising the following steps:
    S1: each GPU hardware thread being able to access respective eight 128-bit-wide independent mask registers, which are recorded as $m0-$m7;
    S2: defaulting data in the $m0 as an execution mask of a GPU hardware thread instruction, and specifying the execution mask of the current instruction by changing a mask address field MSA of the instruction in a program code;
    S3: respectively using instructions to implement a reduction operation, an expansion operations and a logical operation on each mask register, and data movement between each mask register and a general vector register, specifying a corresponding mask register while retaining the nearest parent mask register, and processing a child-parent mask relationship by using a binary tree manner;
    S4: when the use of the mask registers exceeds 8, storing temporarily unused mask operands in the general vector register by means of a movement instruction, and acquiring the mask operands again from the general vector register if necessary;
    S5: implementing a mask reduction operation by using a vector execution unit, completing general and explicit reading of mask reduction, so as to avoid bringing an instruction transmission overhead, and determining whether to add the reduction operation after a user analyzes an application program; and
    S6: when the explicit mask register processes condition control, storing later condition codes in the mask register, and then generating the mask of an instruction sequence of a true branch and the condition code of the instruction sequence of a false branch, wherein the explicit mask avoids the problem of a single mask being covered and restored after being covered, and reduces the data movement between the general vector register and the mask register.

2. The mask operation method for the explicit independent mask register in the GPU according to claim 1, wherein the 128-bit masks and the vector execution unit are organized in a parallel manner of SIMD16, and one mask register can cover 8 executions of the vector unit.

3. The mask operation method for the explicit independent mask register in the GPU according to claim 2, wherein when a vector instruction of the vector unit is transmitted, it is judged whether the mask registers of the instruction are all zero, if so, it means that the instruction will not have any valid output, and the reading and execution of the operation of the corresponding instruction can both be avoided.

4. The mask operation method for the explicit independent mask register in the GPU according to claim 2, wherein the width of the SIMD 16 needs to be reduced, and when a reduction result is not zero, the operand needs to be read and the instruction needs to be transmitted, that is, the mask processing of the SIMD 16 is completed.

5. The mask operation method for the explicit independent mask register in the GPU according to claim 2, wherein the mask reduction instruction can further avoid an inefficient reduction operation before the instruction is transmitted after the analysis of the user, that is, the reduction can certainly exert the aforementioned performance and power consumption optimization effects.

* * * * *